US006394036B2

(12) United States Patent
Burns et al.

(10) Patent No.: US 6,394,036 B2
(45) Date of Patent: May 28, 2002

(54) PET CARRIER FOR TRAVELERS

(75) Inventors: Rebecca Sue Burns, Arlington; Wendell A. Poteet, Fort Worth, both of TX (US)

(73) Assignee: Designer Products, Inc., Arlington, TX (US)

( * ) Notice: Subject to any disclaimer, the term of this patent is extended or adjusted under 35 U.S.C. 154(b) by 0 days.

(21) Appl. No.: 09/882,729

(22) Filed: Jun. 15, 2001

Related U.S. Application Data

(63) Continuation of application No. 09/775,403, filed on Feb. 1, 2001, which is a continuation of application No. 09/619,068, filed on Jul. 19, 2000, now Pat. No. 6,216,637, which is a continuation of application No. 09/407,470, filed on Sep. 28, 1999, now Pat. No. 6,095,090, which is a continuation of application No. 09/323,711, filed on Jun. 1, 1999, now Pat. No. 6,082,305, which is a continuation of application No. 09/143,825, filed on Aug. 31, 1998, now Pat. No. 5,931,120, which is a continuation-in-part of application No. 08/926,525, filed on Sep. 8, 1997, now abandoned.

(51) Int. Cl.$^7$ .................................................. A01K 1/00
(52) U.S. Cl. ...................................................... 119/497
(58) Field of Search ................................ 119/497, 453, 119/496, 500; 190/103, 107, 109, 111

(56) References Cited

U.S. PATENT DOCUMENTS

| | | | | |
|---|---|---|---|---|
| 5,931,120 A | * | 8/1999 | Burns et al. | ................. 119/497 |
| 6,082,305 A | * | 7/2000 | Burns et al. | ................. 119/497 |
| 6,095,090 A | * | 8/2000 | Burns et al. | ................. 119/497 |
| 6,216,637 B1 | * | 4/2001 | Burns et al. | ................. 119/497 |

* cited by examiner

*Primary Examiner*—Thomas Price
(74) *Attorney, Agent, or Firm*—Michael A. O'Neal

(57) ABSTRACT

A pet carrier for use in transporting pets within the passenger compartments of aircraft includes selectively closeable windows formed from mesh fabric, a fully openable end and a fully openable side for providing access to the interior of the pet carrier, an access port in the top having a full length double zipper closure and a rotatable locking member for securing the access port in the closed condition, a multifunction strap securable to the opposite ends of the pet carrier for use as a shoulder strap and securable to one end of the pet carrier for use as a pulling strap; individually removable rollers supporting the pet carrier for rolling movement over an underlying surface; and a removable floor.

1 Claim, 11 Drawing Sheets

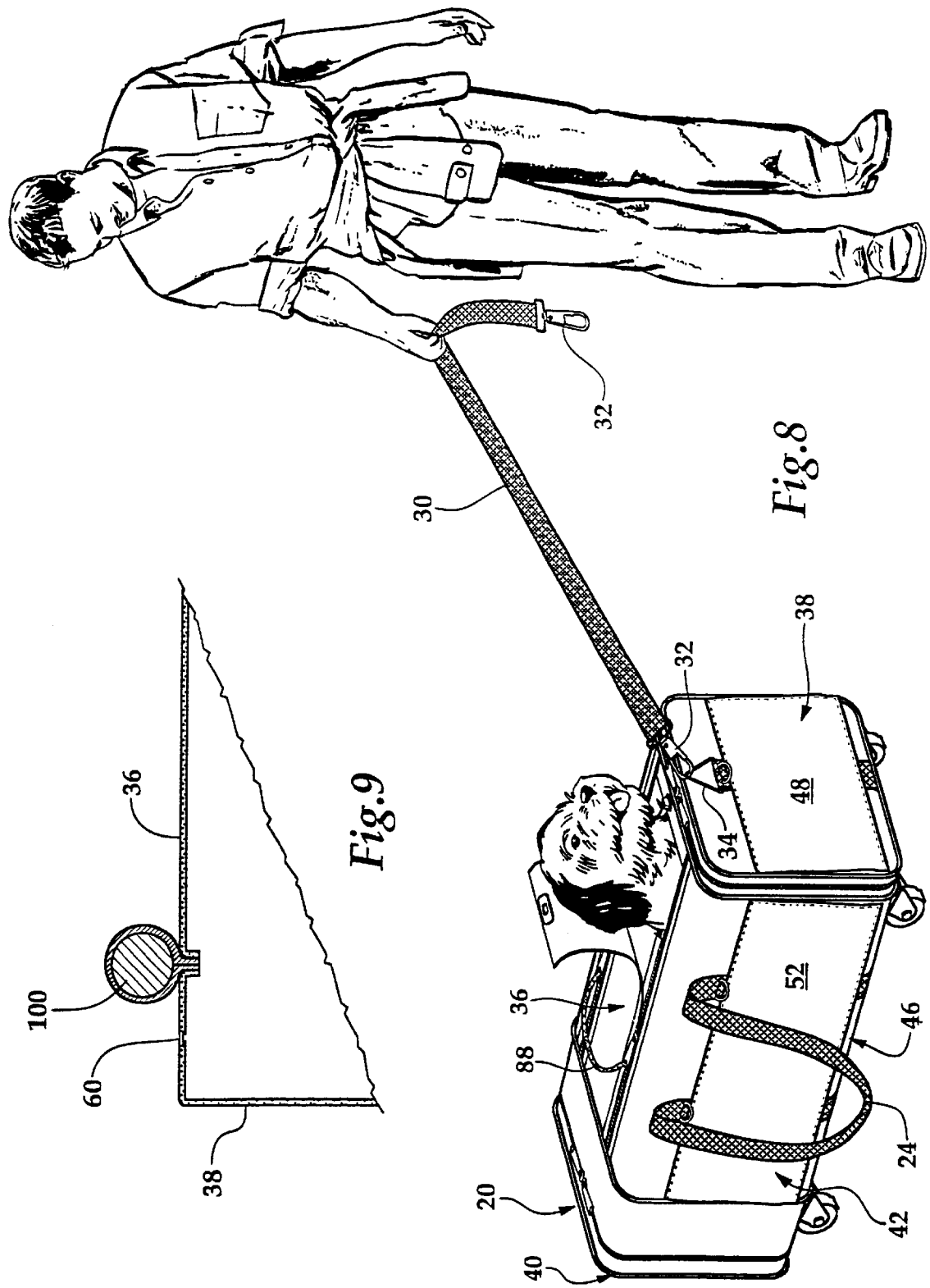

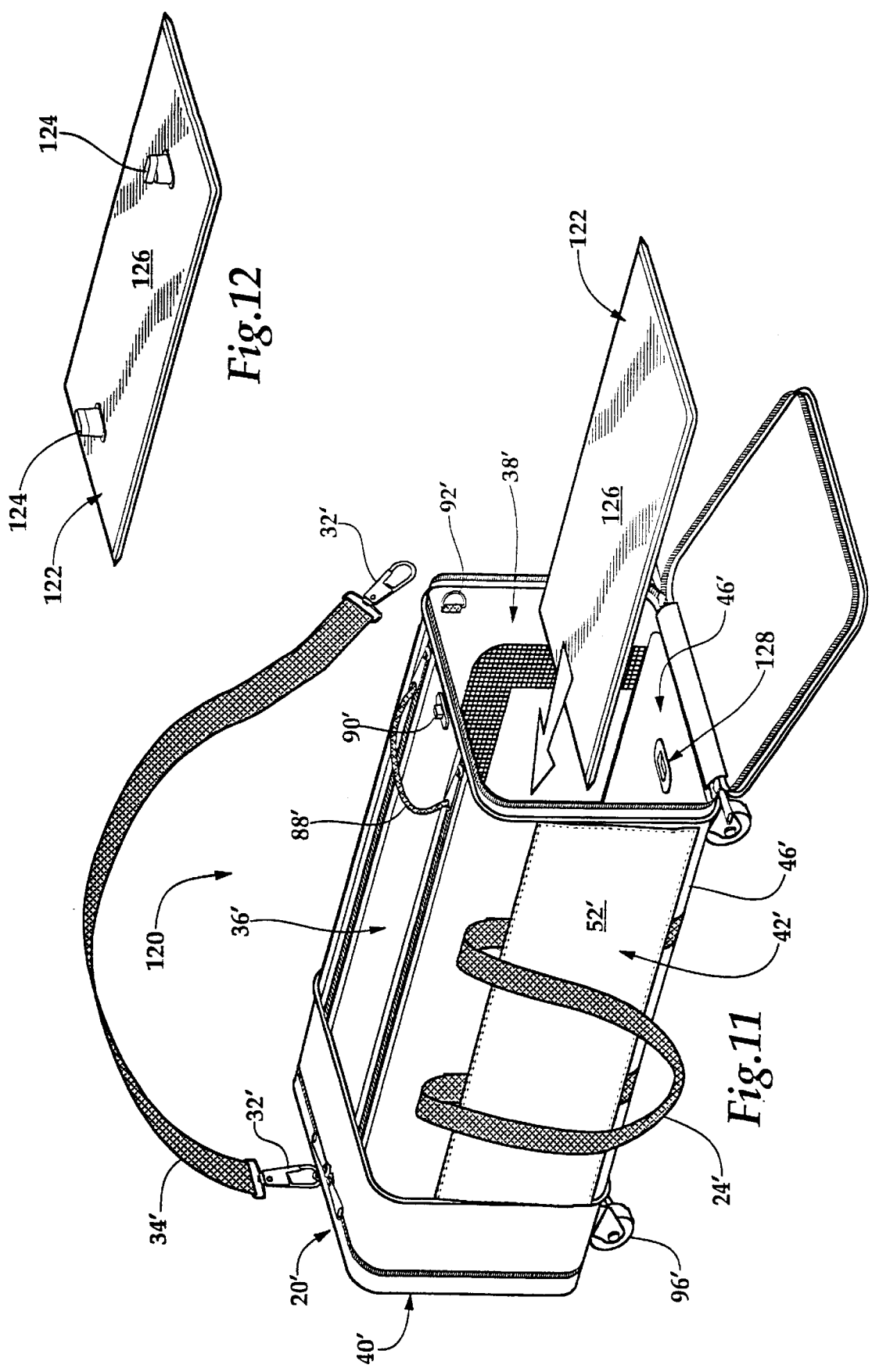

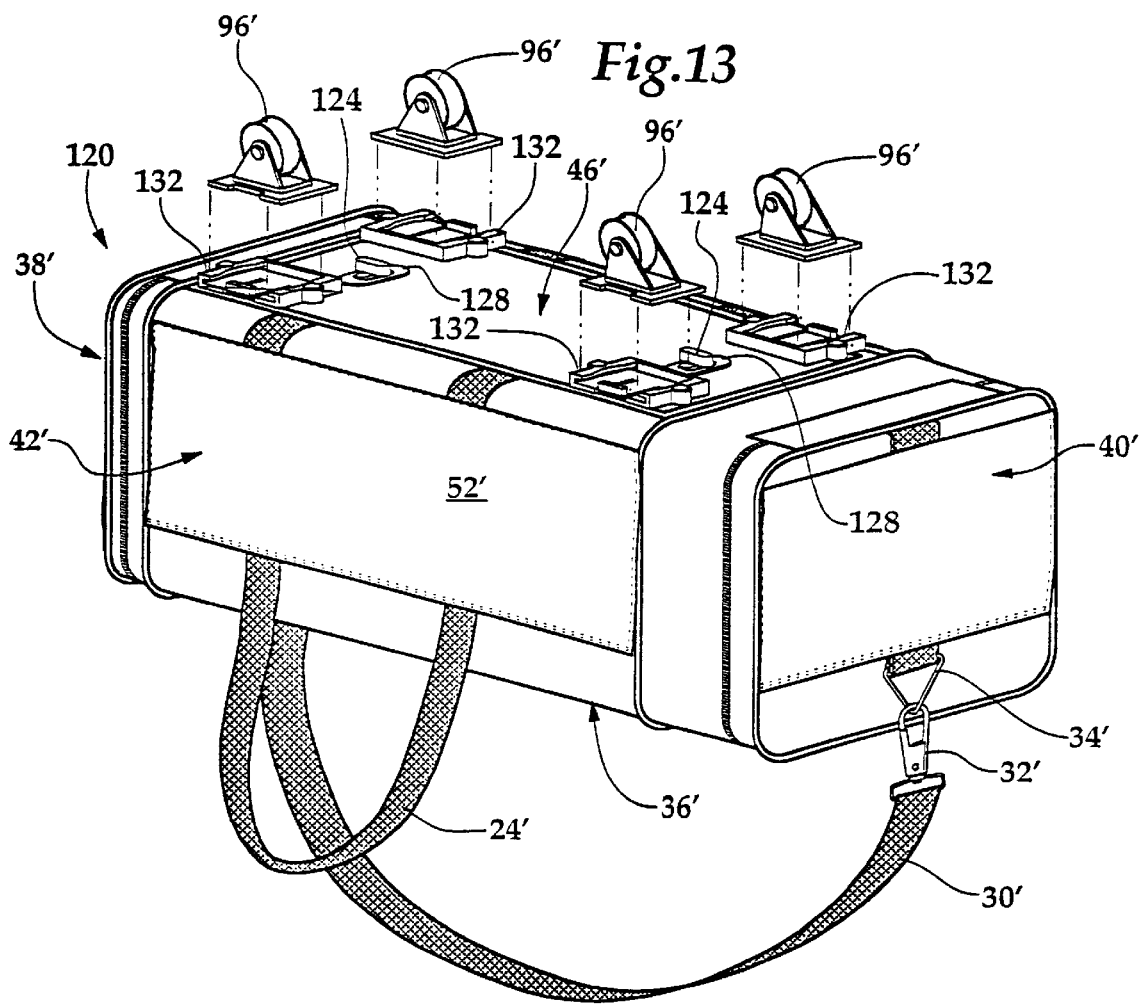
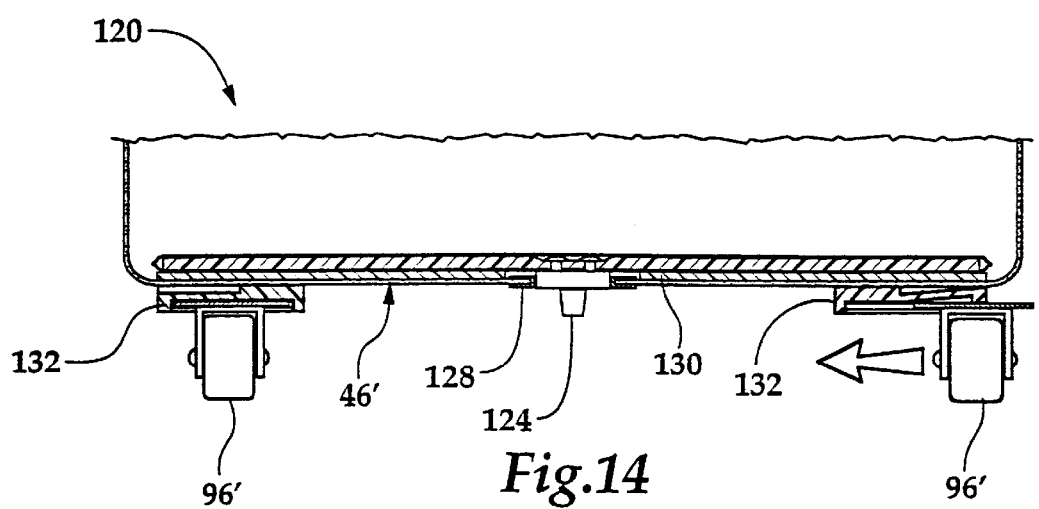

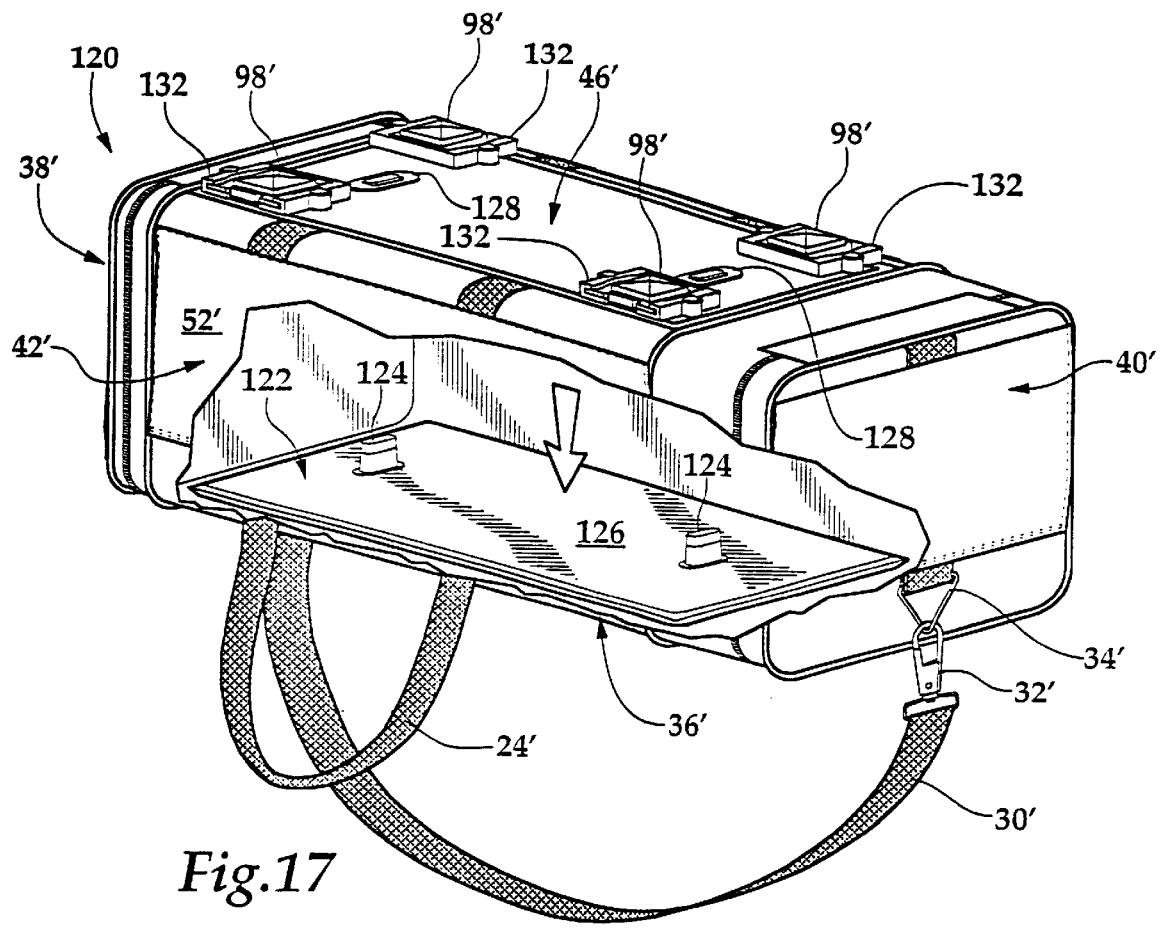
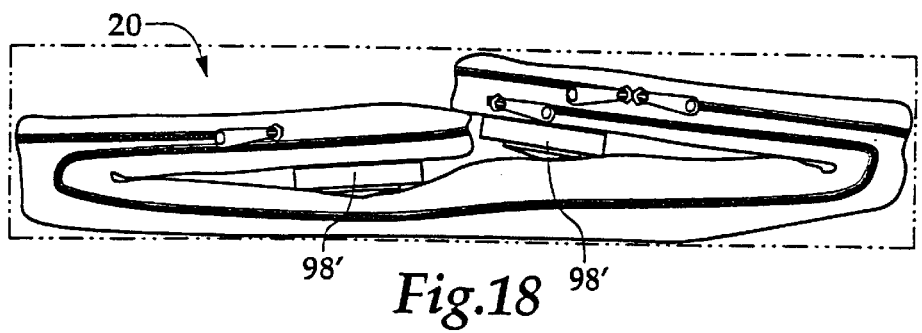

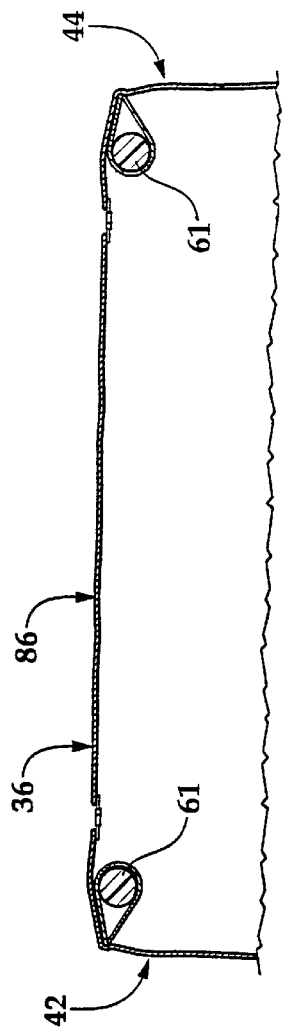
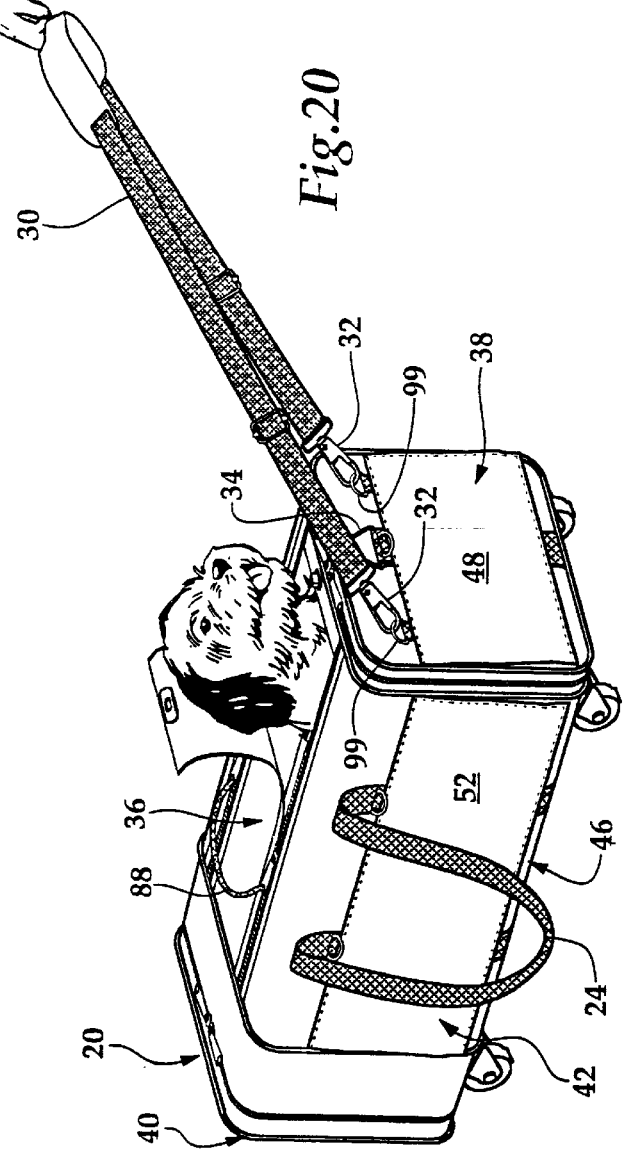
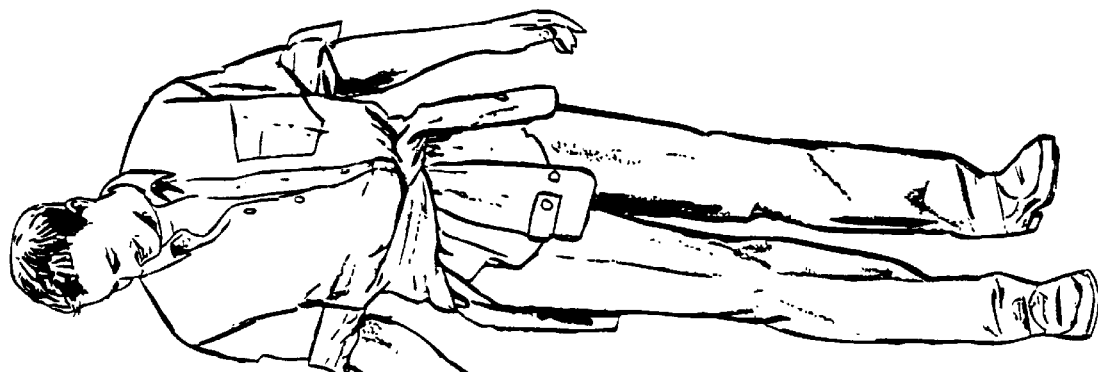
Fig.19
Fig.20

PET CARRIER FOR TRAVELERS

CROSS-REFERENCE TO RELATED APPLICATIONS

This application is a continuation of Ser. No. 09/775,403 filed Feb. 1, 2001, which is a continuation of Ser. No. 09/619,068 filed Jul. 19, 2000 now U.S. Pat. No. 6,216,637 which is a continuation of Ser. No. 09/407,470 filed Sep. 28, 1999 now U.S. Pat. No. 6,095,090 which is a application Ser. No. 09/323,711, now U.S Pat. No. 6,082,305 which is continuation of application Ser. No. 09/143,825, filed Aug. 31, 1998 now U.S. Pat. No. 5,931,120, which is a continuation-in-part of application Ser. No. 08/926,525, filed Sep. 8, 1997, abandoned.

TECHNICAL FIELD

This invention relates generally to pet carries, and more particularly to a pet carrier for use in transporting small dogs, cats, and other small pets within the passenger compartment of an aircraft, or during automobile travel, or during visits to the veternarian.

BACKGROUND AND SUMMARY OF THE INVENTION

As is well known, travelers wishing to take pets with them during aircraft travel have traditionally been required to house their pets in crates for transportation in the luggage compartment or hold of the aircraft. This is unsatisfactory for several reasons. First, the pets are subject to injury or death if the crates in which they are housed are dropped or overturned either during handling to and from the aircraft or during flight. Second, the luggage compartment of an aircraft is typically neither pressurized or air conditioned, which can lead to asphyxiation of pets transported in luggage compartments if sufficient oxygen is not present. Third, delays in baggage handling and unavoidable delays caused by weather, mechanical problems, etc., can subject pets carried in aircraft luggage compartments to temperature extremes which can cause injury to or death of the pets.

The foregoing and other problems resulting from the transportation of pets in aircraft luggage compartments or holds has resulted in the transportation of small dogs, cats, and other similarly-sized pets within the passenger compartment of aircraft. For obvious reasons, pets presented for transportation within the passenger compartment must be constrained within pet carriers. Both hardside and softside pet carriers have been used for this purpose, with softside pet carriers being generally preferred because they are relatively light weight, adaptable to a variety of circumstances which may be encountered during a trip, and, at least in some instances, collapsible for storage when not in use.

Although generally satisfactory, the softside pet carriers intended for the transportation of pets within the passenger compartment of aircraft have exhibited numerous disadvantages. First, the design of prior art softside pet carriers has required that they be carried, either using handgrips or shoulder straps, whenever relocation is indicated. Second, the access ports of prior art softside pet carriers have not been sufficiently secure against opening by and subsequent escape of the pets intended to be restrained therein. Third, prior art softside pet carriers have not been provided with sufficient storage capacity to allow the transportation of food, water, and the necessary dishes and other accessories which must be utilized during the transportation of pets.

The present invention comprises a pet carrier for travelers which overcomes the foregoing and other difficulties long since associated with the prior art. In accordance with the broader aspects of the invention, there is provided a softside pet carrier including a bottom, two sides, two ends, and a top. The bottom is provided with wheels, rollers, or skids whereby the pet carrier and the pet contained therein can be easily pulled through airports, and in similar situations. The wheels, rollers, or skids are preferably removable to reduce the overall height of the pet carrier and to prevent unintended movement thereof.

The walls and at least one end of the pet carrier comprise windows formed from sturdy mesh panels to afford ventilation and allow the pet owner and the pet to see in and out, respectively. One or more of the windows may be coverable in instances in which privacy or confinement is preferred. One wall of the pet carrier is fully openable to allow the pet carrier to be used as a bed or crate when not in use for transportation. The openable side wall includes a pocket for use in storing veterinary documents and other small items.

One end of the pet carrier is provided with a large storage compartment adapted to receive food, water, bowls, and other accessories necessary for the proper care of a pet during transportation. The top includes an access port having a full length double zipper construction which facilitates ingress and egress of the pet. The double zipper opening can be used to allow the pet to have exposure through the centrally open top of the carrier, if desired, with the pet being secured by a leash ring. The access port is fully lockable to prevent the escape of the pet housed within the pet carrier.

In accordance with a second embodiment of the invention, a pet carrier is provided with a removable floor. In use, the removable floor is secured to the bottom of the pet carrier by rotary locks. The rotary locks of the removable floor extend through lock receiving members which are mounted in frame members comprising part of the bottom of the floor of the pet carrier. The frame members also support retainers which receive individually removable wheels and/or skids.

An advantage in the use of the second embodiment of the invention comprises the foldability thereof for transportation and storage. The floor is released from frame members and is positioned adjacent the top wall. The bottom wall and the end walls are then folded inwardly, thereby substantially reducing the height of the pet carrier.

BRIEF DESCRIPTION OF THE DRAWINGS

A more complete understanding of the invention may be had by reference to the following detailed description when taken in conjunction with the accompanying drawings:

FIG. 8 is an illustration of the use of the pet carrier of the present invention showing the shoulder strap of the pet carrier in its pulling configuration and illustrating the head of a pet extending through the partially open top of the pet carrier;

FIG. 9 is a greatly enlarged partial sectional view showing suspension structure of the pet carrier of the present invention;

FIG. 11 is a perspective view illustrating a pet carrier comprising a second embodiment of the invention;

FIG. 12 is a perspective view illustrating the bottom of the removable floor of the pet carrier of FIG. 11;

FIG. 13 is a bottom perspective view of the pet carrier of FIG. 11 showing the removable wheels thereof;

FIG. 14 is a transverse sectional view taken through the bottom of the pet carrier of FIG. 11 showing the installation of the removable wheels;

FIG. 17 is a bottom perspective view of the pet carrier of FIG. 11 in which one wall has been broken away to illustrate a first step in the folding of the pet carrier;

FIG. 18 is an end view illustrating the pet carrier in its folded condition;

FIG. 19 is a transverse sectional view of the upper portion of the pet carrier; and FIG. 20 is a view similar to FIG. 8 showing the strap connected at both ends.

DETAILED DESCRIPTION

Figure 1:
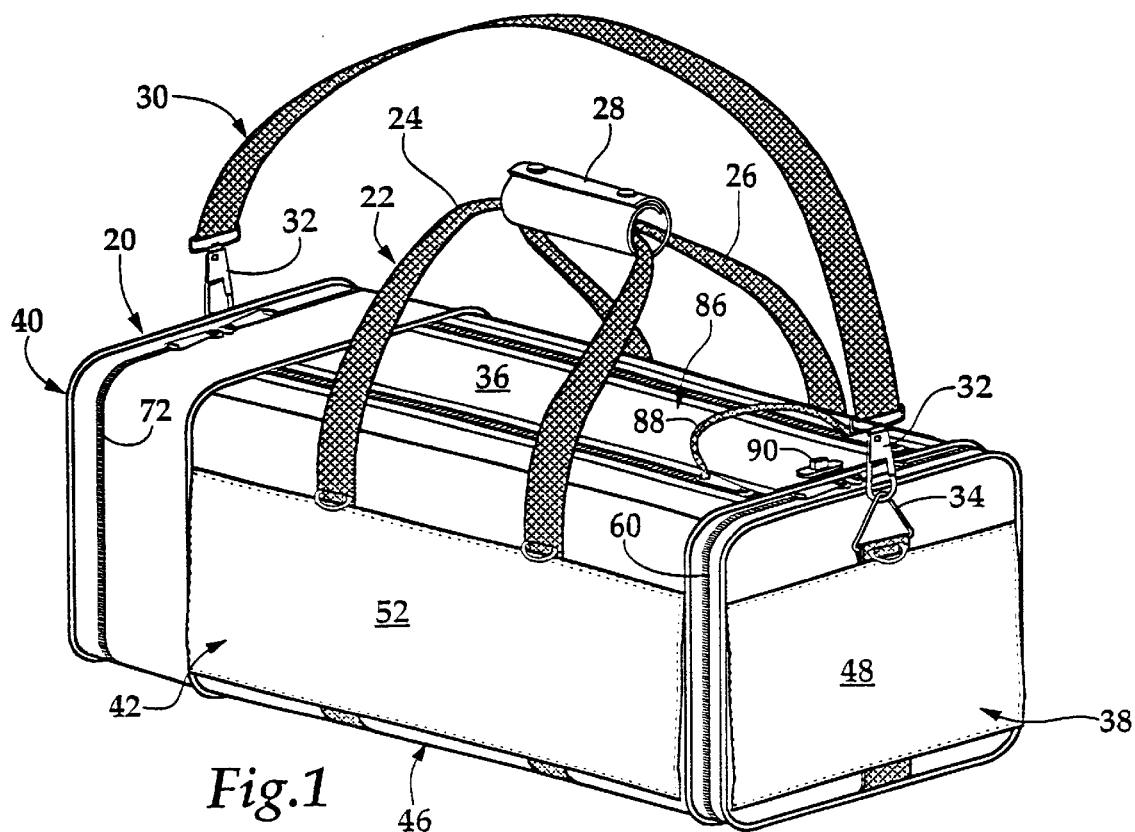
FIG. 1 is a perspective view of the pet carrier for travelers of the present invention taken from one end thereof and showing the pet carrier in its fully closed configuration.
Figure 2:
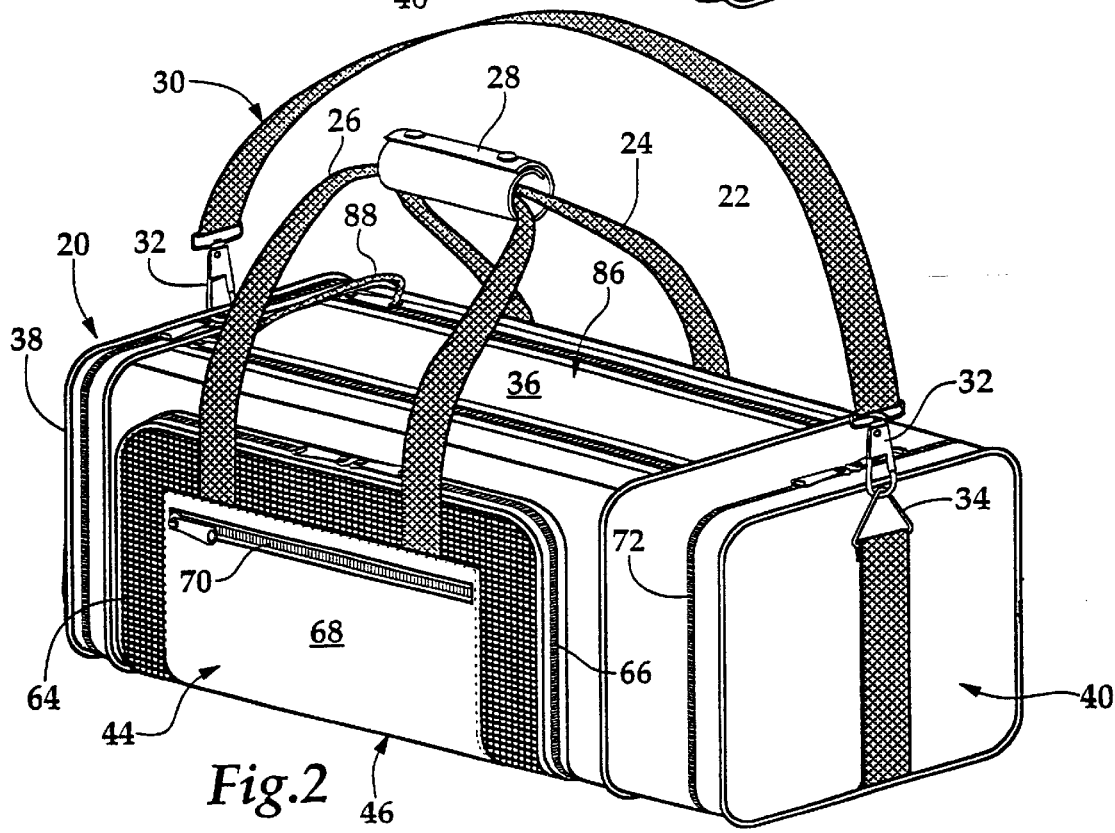
FIG. 2 is a perspective view of the pet carrier of FIG. 1 taken from the opposite end thereof.

Referring now to the Drawings, and particularly to FIGS. 1 and 2 thereof, there is shown a pet carrier 20 comprising a first embodiment of the invention. The pet carrier 20 comprises a normally closed container having a rectangular cross-section both as to its width and as to its length, it being understood that other cross-sectional configurations may be used in the practice of the invention, if desired. The pet carrier 20 may be constructed from 1200 denier polyester pvc coated waterproof fabric of the type commonly used in the construction of softside luggage, however, it will be understood that other materials may be utilized in the construction of the pet carrier 20, depending on the requirements of particular applications of the invention.

The pet carrier may be provided with a conventional handle 22 comprising opposed handle portions 24 and 26 secured to opposite sides of the pet carrier 20. The handle portions 24 and 26 may be joined together at the mid-points thereof by a gripping member 28 which snaps onto itself in the usual manner to provide a comfortable handgrip for the pet carrier 20. The pet carrier 20 is further provided with a multi-function strap 30 which is adjustable in length and which has selectively openable hooks 32 at each end thereof. In FIGS. 1 and 2 the multi-function strap 30 is shown in its shoulder strap mode with the hooks 32 being engaged with rings 34 secured at the opposite ends of the pet carrier 20. When used as a shoulder strap, the multi-function strap facilitates carrying the pet on quick in-and-out of the car trips.

Figure 3:
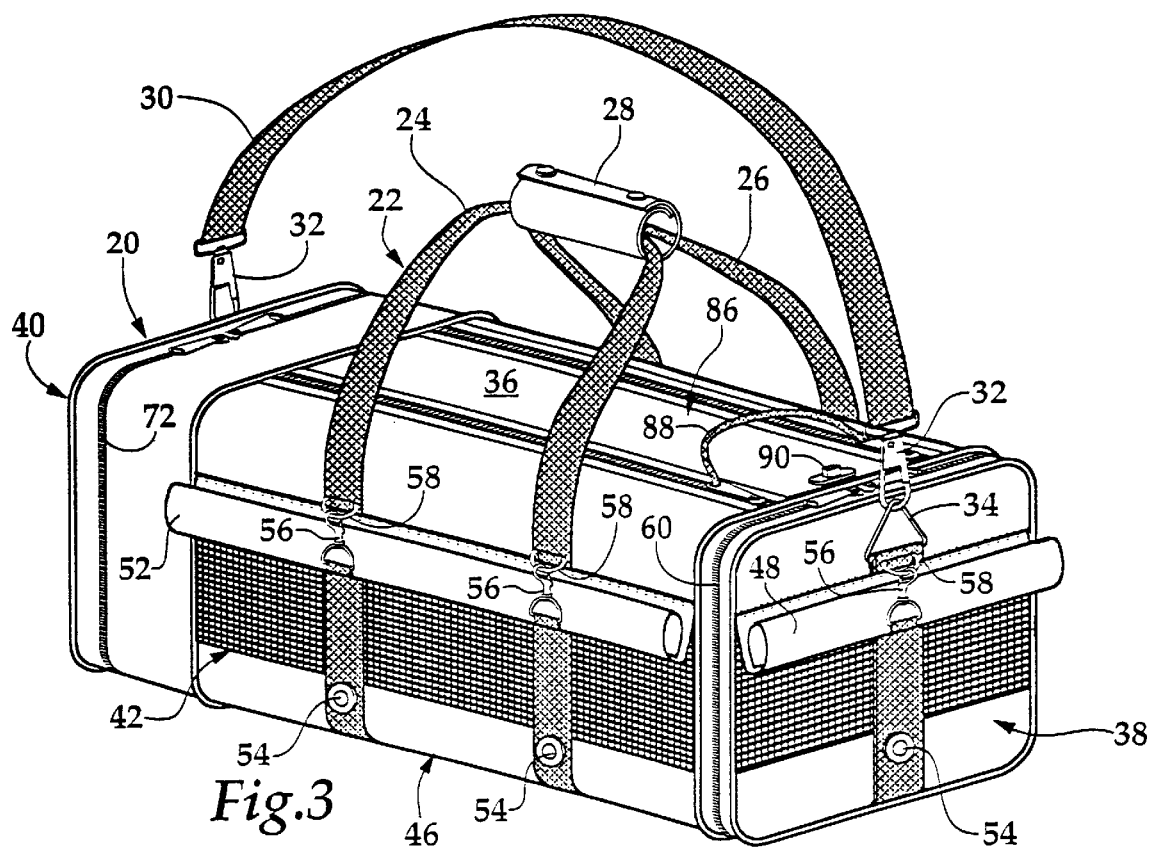
FIG. 3 is a view similar to FIG. 1 illustrating the closure flaps of the pet carrier in the open condition.

Pet carrier 20 includes a top 36, ends 38 and 40, sides 42 and 44, and a bottom 46. As is best shown in FIGS. 1 and 3, the end 38 and the side 42 are provided with closure panels 48 and 52 which may be secured in their closed positions as shown in FIG. 1 by snaps 54 (FIG. 3). Alternatively, either or both of the panels 48 and 52 may be secured in the open conditions illustrated in FIG. 3 by means of selectively openable hooks 56 which engage rings 58 secured to the end 38 and the wall 42. As is further illustrated in FIG. 3, the walls 38 and 42 comprise windows formed from a strong but flexible net material which provides the ventilation into the interior of the pet carrier 20 and which allows visual access by pet owners and pets into and out of the pet carrier 20, respectively.

Figure 5:
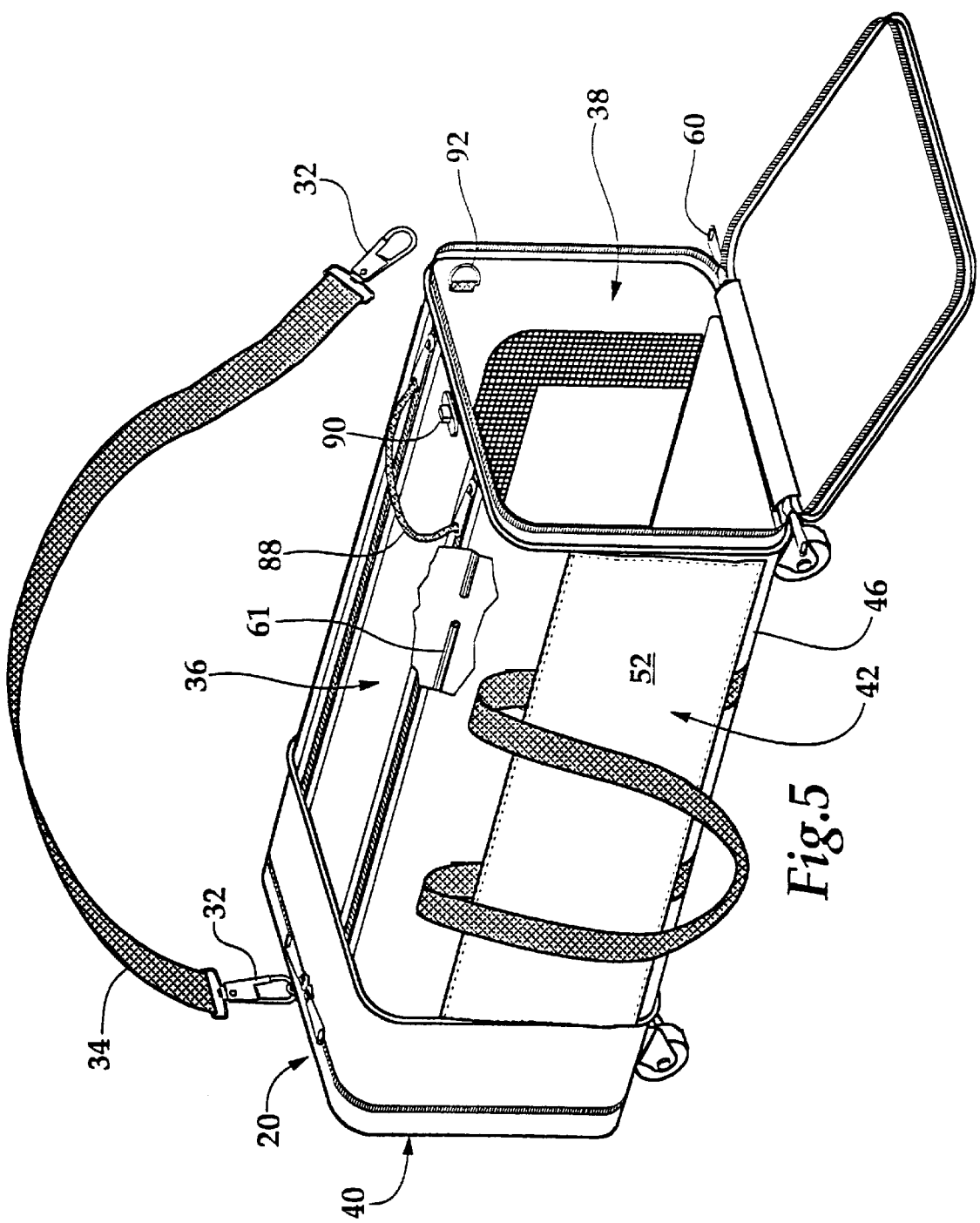
FIG. 5 is a view similar to FIG. 3 showing one end of the pet carrier in the open condition.

As is illustrated in FIG. 5, the end 38 of the pet carrier 20 is provided with a zipper 60 which is adapted for actuation to allow the end 38 to be fully opened. By means of the zipper 60, the end 38 comprises not only a window formed from the mesh material and selectively coverable by the panel 48, but also a fully openable door. The fully openable door comprising the end 38 is highly convenient in affording ingress and egress to and from the pet carrier 20 for pets, and also to facilitate cleaning of the interior of the pet carrier 20. FIG. 5 also illustrates fiberglass rods 61 extending along the upper corners of the pet carrier to maintain the pet carrier in a fully open condition while providing collapsibility when needed. The rods 61 are further illustrated in FIG. 19.

Figure 4:
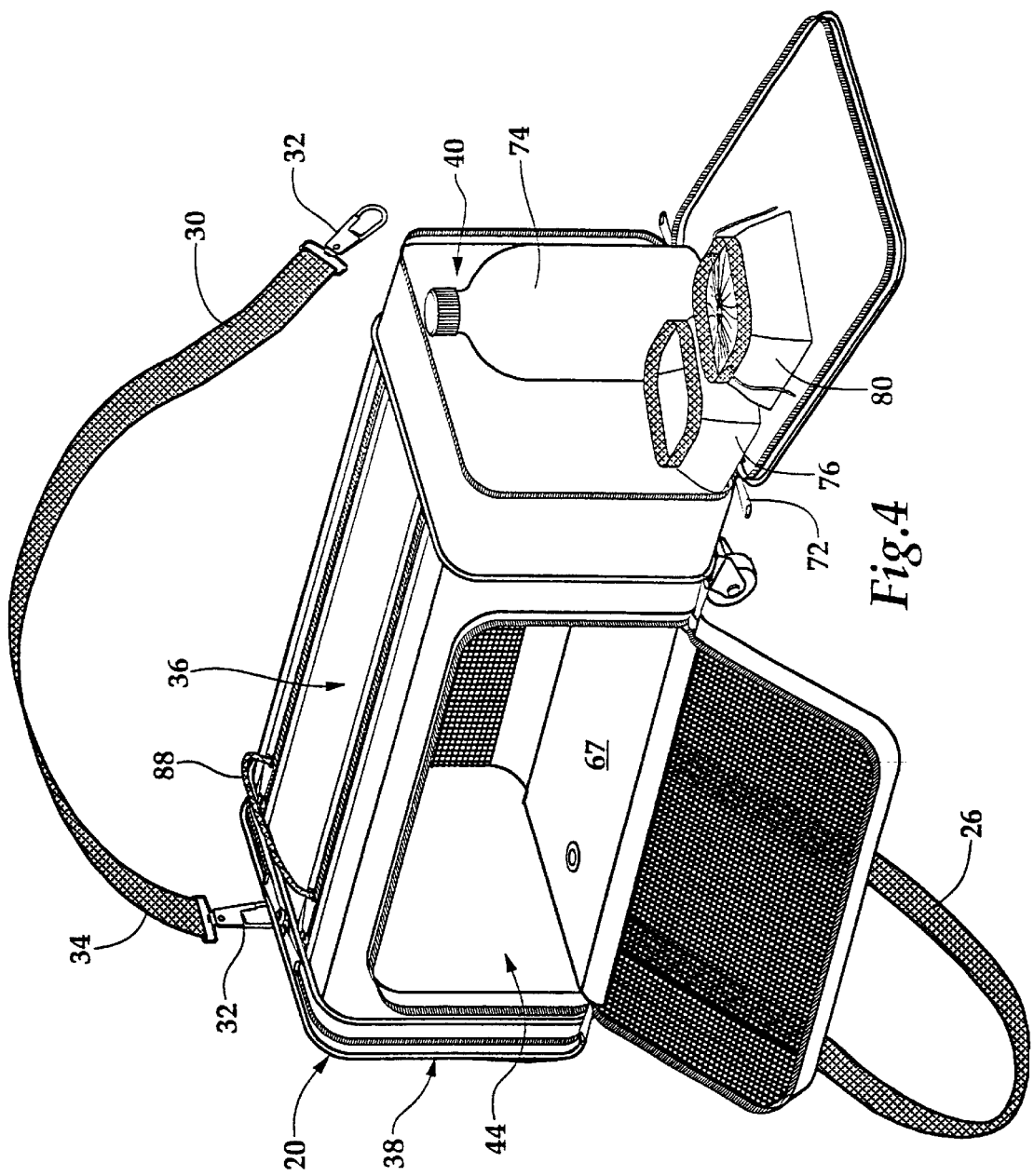
FIG. 4 is a view similar to FIG. 2 showing one of the sidewalls of the pet carrier in the fully open condition and illustrating the storage compartment of the pet carrier.

Referring now to FIGS. 2 and 4, the side 44 of the pet carrier 20 comprises a window 64 formed from mesh fabric which is both strong and flexible. The use of mesh fabric in the construction of the window 64 is highly advantageous in that it allows ventilation into and out of the interior of the pet carrier 20 and also provides visual access into and out of the interior of the pet carrier 20 for pet owners and pets, respectively. A zipper 66 extends around the periphery of the window 64 and is selectively operable to allow the window 64 to be fully opened in the manner illustrated in FIG. 4. This feature of the invention is highly advantageous in that it allows the pet carrier 20 to be used as a crate or bed when not in use as a pet carrier. FIG. 4 further illustrates a removable floor plate 67 which is preferably removable to facilitate cleaning of the pet carrier 20.

The window 64 further comprises a storage compartment 68 which is normally secured in a closed condition by a zipper 70. The storage compartment 68 provides convenient storage for veterinary records and other papers relating to the pet transported within the pet carrier 20. The storage compartment 68 may also be used to receive and store medicines and other small articles attendant to the comfort and safety of the pet.

The end 40 of the pet carrier 20 comprises a large storage compartment which is normally secured in the closed condition by a zipper 72. The storage compartment comprising the end 40 is adapted to receive a water transport container 74, a collapsible water bowl 76, and a collapsible food bowl 80 having a top that can be closed to secure pet food therein. The storage compartment can also store other accessories for the care and maintenance of the pet utilizing the pet carrier 20.

Figure 6:
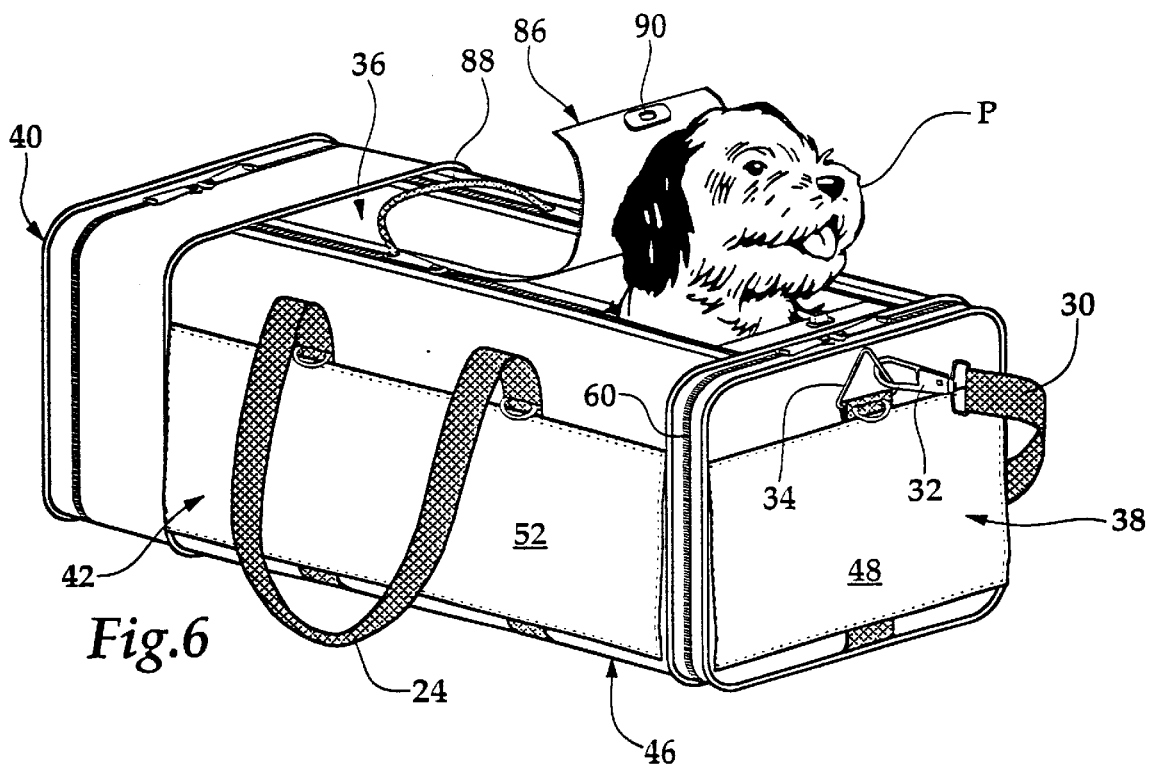
FIG. 6 is a view similar to FIG. 3 showing the top of the pet carrier in the open condition.

As is best shown in FIGS. 1 and 6, the top 36 of the pet carrier 20 comprises an access port 86 which is normally secured in the closed configuration by a double zipper closure 88 and a rotatable locking member 90 of the type normally used in luggage construction. When fully opened the access port 86 provides convenient ingress and egress from the interior of the pet carrier 20 for the pet to be carried therein which is substantially wider than would be the case with a single zipper top opening. The access port 86 also provides convenient access to the interior of the pet carrier 20 for cleaning. An important feature of the present invention comprises the fact that the access port 86 may be partially opened to allow the pet contained within the pet carrier 20 to project its head out of the top of the pet carrier when circumstances permit. To this end, a retaining ring 92 is provided within the interior of the pet carrier 20 to secure the pet against jumping out through the access port 86 when it is partially opened.

Figure 7:
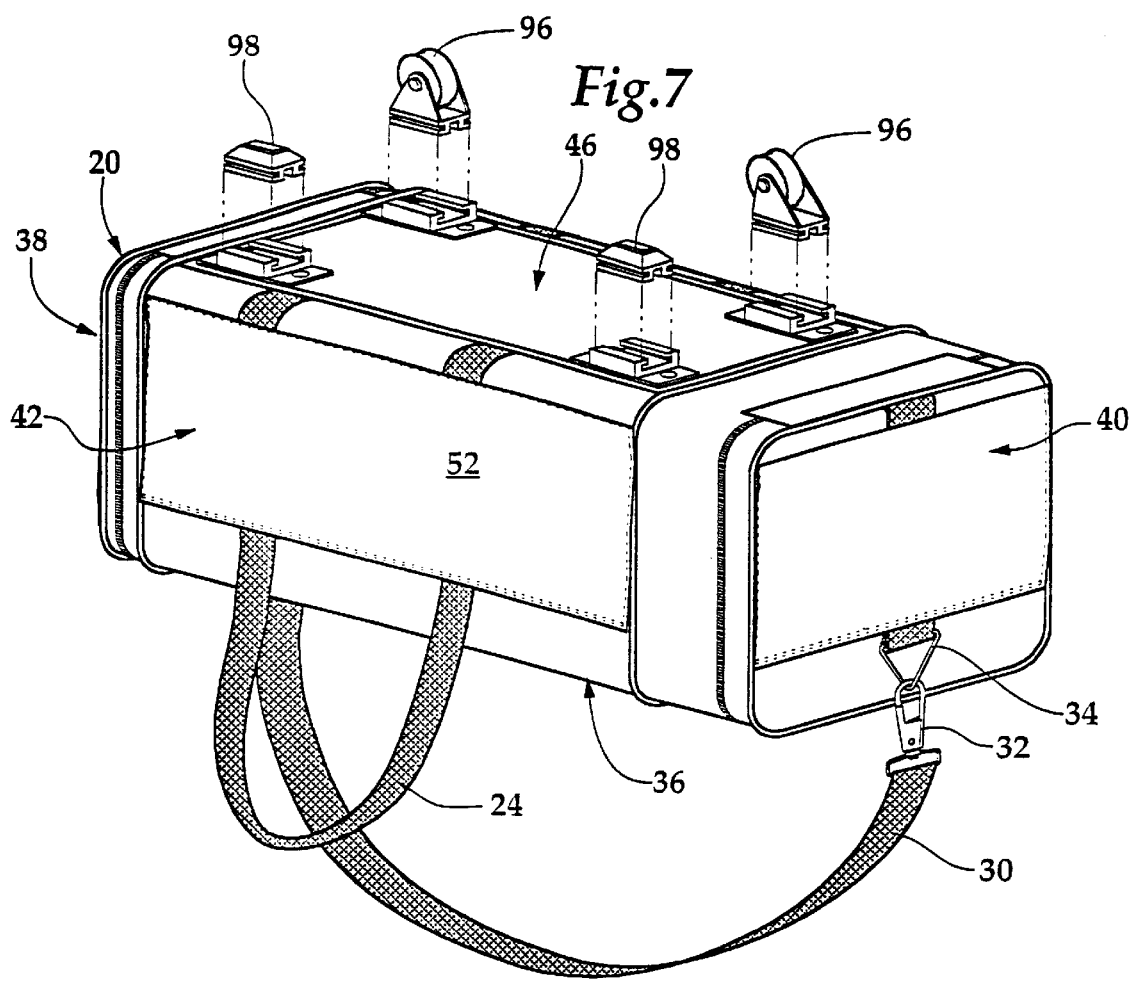
FIG. 7 is an illustration of the bottom of the pet carrier of FIG. 1.

Referring now to FIG. 7, the bottom 46 of the pet carrier 20 is shown. The bottom 46 is provided with a plurality of wheels or rollers 96 or skids 98 which facilitate the transportation of the pet carrier 20 and the pet contained therein through airports, and in similar situations. The wheels or rollers 96 or skids 98 are preferably removable from the bottom 46 in order to reduce the overall height of the pet carrier 20, and also to secure the pet carrier 20 against inadvertent movement at all times except during the actual transportation of a pet within the pet carrier 20.

The use of the pet carrier 20 is illustrated in FIG. 8. The multi-function strap 30 is disengaged from the ring 34 at one end of the pet carrier 20 and is used in its pulling mode to roll or slide the pet carrier 20 through an airport or other similar circumstance by means of the wheels or rollers 96 or skids 98 secured to the bottom 46 thereof. If circumstances permit, the access port 86 comprising the top 36 of the pet carrier 20 may be partially opened to allow the pet to project its head therethrough. In such circumstances the pet carrier is preferably secured within the interior of the pet carrier 20 by connecting its collar to the retaining ring 92. As shown in FIG. 20, duel rings 99 which receive the opposite ends of the strap 30 may be provided, depending on the requirements of particular applications of the invention.

Figure 10:
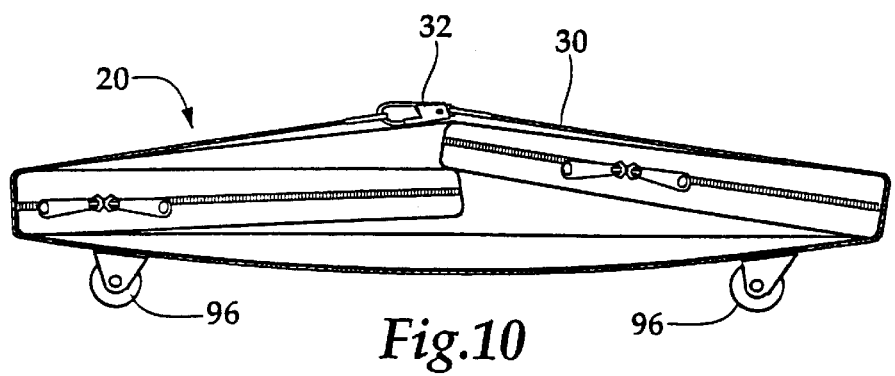
FIG. 10 is an illustration of the pet carrier of the present invention fully collapsed for storage.
Figure 15:
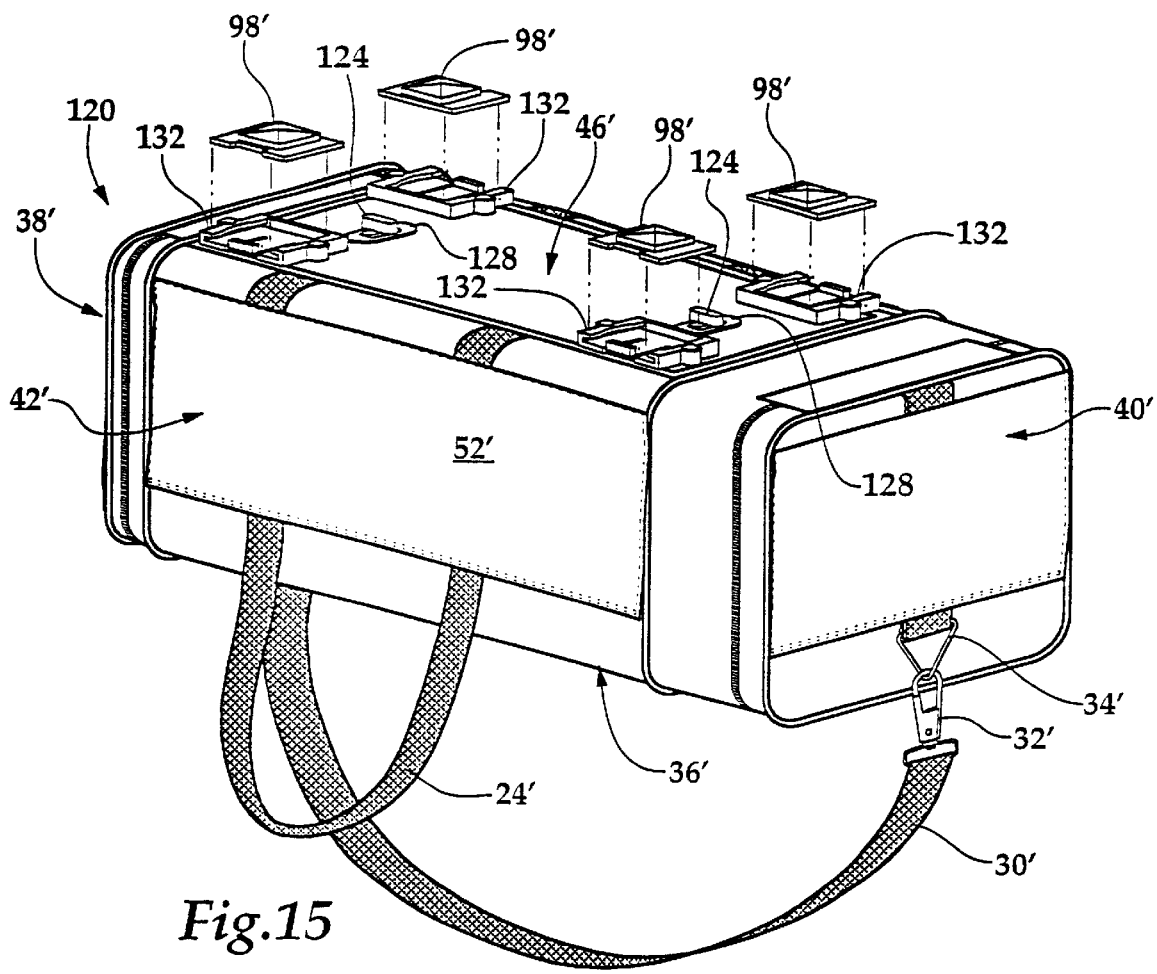
FIG. 15 is a view similar to FIG. 13 showing the removable skids of the pet carrier.
Figure 16:
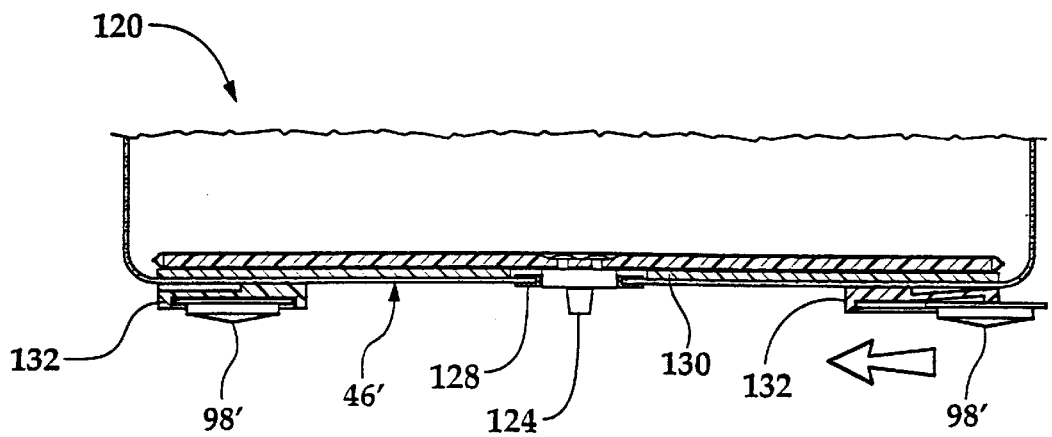
FIG. 16 is a view similar to FIG. 14 showing the installation of the removable skids.

FIG. 9 illustrates an important feature of the invention. The pet carrier 20 is provided with supporting members 100 which are secured along the walls 42 and 44 and the top 36 of the pet carrier 20 adjacent the ends 38 and 40 thereof. The supporting members are preferably formed from fiberglass which allows the pet carrier to be collapsed when located under the seat of an aircraft. The supporting members 100 may also be formed from suitably flexible wire or other materials. The use of the supporting members 100 is important in that it prevents the top 36 of the pet carrier from collapsing down onto the pet and maintains the interior of the pet carrier 20 in its fully open and upright condition to provide maximum freedom of movement and maximum interior space for the enjoyment of the pet contained therein. As is shown in FIG. 10, the supporting members 100 allow the pet carrier 20 to be folded for storage.

Referring now to FIGS. 11 through 18, inclusive, there is shown a pet carrier 120 comprising a second embodiment of the invention. The pet carrier 120 comprises numerous component parts which are substantially identical in construction and function to the component parts of the pet carrier 20 illustrated in FIGS. 1 through 10 inclusive, and described hereinabove in connection therewith. Such identical component parts are designated in FIGS. 11 through 14 inclusive, with the same reference numerals utilized in the foregoing description of the pet carrier 20, but are differentiated therefrom by means of a prime (') designation.

The pet carrier 120 includes a removable floor 122. As is best shown in FIG. 12, the bottom of the removable floor 122 is provided with a pair of rotatable locks 124. The removable floor 122 is preferably relatively rigid in construction, and has an exterior surface 126 which is impervious to moisture and readily adapted to cleaning. In lieu of the rotatable locks 124, the floor 122 may be secured by snaps, Velcro® hook and loop fasteners, and other conventional fasteners suitable for use in luggage and similar applications.

The bottom 46' of the pet carrier 120 is provided with lock receiving members 128. As is best shown in FIG. 14, the lock receiving members 128 of the pet carrier 120 are secured in a frame member 130 which is in turn secured to the bottom 46' of the pet carrier 120. The frame member 130 also supports retainers 132 which selectively receive and retain either individually removable wheels 96' or individually removable skids (as shown in FIG. 7). The use of the frame members 130 to secure the lock receiving members 128 and the retainers 132 comprises an important feature of the invention in that the frame members 130 lend stability to the bottom of the pet carrier 120 and assure that the lock receiving members 128 and the retainers 132 are secured in place.

The use of individually removable wheels and/or skids also comprises an important feature of the invention. Individual wheels and/or skids are much easier to store than would be the case if the wheels and/or skids were mounted on a subframe which was in turn securable to the bottom of the pet carrier. Also, individually removable wheels and/or skids allow selected wheels to be replaced with skids in the event it is desired to facilitate both rolling transport of the pet carrier across an underlying surface and stability of the pet carrier when it is not in motion.

FIGS. 17 and 18 illustrate the folding of the second embodiment of the invention for transportation and storage. Referring specifically to FIG. 17, the removable floor 122 is disengaged from the bottom wall 46' and is moved into engagement with the top wall 36'. The bottom wall 46' is next folded inwardly, followed by downward and inward folding of the end walls 38' and 40'. FIG. 18 illustrates the completion of the folding procedure. FIG. 18 also illustrates in broken lines a conventional paperboard box which receives the pet carrier for transportation, marketing, and storage.

The foldability of the pet carrier 120 comprises an important feature of the invention. The folding procedure as illustrated in FIGS. 17 and 18 reduces the overall height of the pet carrier to approximately ⅓ of its height in the operating configuration. The foldability of the pet carrier is a significant advantage in that it reduces transportation costs and facilitates marketing of the pet carrier. The foldability of the pet carrier is also advantageous in facilitating storage thereof when it is not in use.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A pet carrier comprising:
opposed first and second side walls, opposed first and second end walls, and opposed top and bottom walls defining an enclosed interior space characterized by predetermined length, width, and height dimensions;
an openable access port formed in the top wall;
a removable floor;
a pair of lock members mounted on the removable floor;
lock member receiving apparatus on the bottom wall for receiving the lock members of the removable floor to secure the floor in place; and
support members for normally maintaining the first and second side walls and the first and second end walls upright to afford maximum space within the pet carrier and each inwardly collapsible when the floor is unlocked to facilitate transportation and storage of the pet carrier.

* * * * *